US011466782B2

(12) United States Patent
Nishimura

(10) Patent No.: US 11,466,782 B2
(45) Date of Patent: Oct. 11, 2022

(54) BUTTERFLY VALVE

(71) Applicant: CKD CORPORATION, Komaki (JP)

(72) Inventor: Yasunori Nishimura, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 17/430,175

(22) PCT Filed: Feb. 21, 2020

(86) PCT No.: PCT/JP2020/006985
§ 371 (c)(1),
(2) Date: Aug. 11, 2021

(87) PCT Pub. No.: WO2020/195418
PCT Pub. Date: Oct. 1, 2020

(65) Prior Publication Data
US 2022/0099192 A1 Mar. 31, 2022

(30) Foreign Application Priority Data

Mar. 26, 2019 (JP) .............................. JP2019-058336

(51) Int. Cl.
*F16K 1/22* (2006.01)
*F16K 31/04* (2006.01)
*F16K 37/00* (2006.01)

(52) U.S. Cl.
CPC .............. *F16K 1/22* (2013.01); *F16K 31/04* (2013.01); *F16K 37/0025* (2013.01)

(58) Field of Classification Search
CPC . F16K 1/22; F16K 1/221; F16K 1/222; F16K 1/224
See application file for complete search history.

(56) References Cited

U.S. PATENT DOCUMENTS 3,996,961 A * 12/1976 Siegwart ................... F16K 1/22
137/527.8
6,702,257 B1 * 3/2004 Mollmann .............. F16K 1/222
251/305
2006/0017036 A1 * 1/2006 Rauch ..................... F16K 1/221
251/305

(Continued)

FOREIGN PATENT DOCUMENTS

CN 201891510 U 7/2011
JP H01-255716 A 10/1989

(Continued)

OTHER PUBLICATIONS

Translation of JP2015169280 (Year: 2022).*

(Continued)

*Primary Examiner* — Kelsey E Cary
(74) *Attorney, Agent, or Firm* — Oliff PLC

(57) ABSTRACT

A butterfly valve has a rod connected to a DD motor and disposed along a direction orthogonal to a flow path, and a butterfly valve body that is linked to the rod and that opens and closes the flow path due to the rod being rotated by the DD motor, wherein a linking body center of gravity, which is the center of gravity of a rotating liking body having at least the rod and the butterfly valve body as constituent members, is positioned on an axial line of a rotating shaft of the DD motor.

5 Claims, 8 Drawing Sheets

(56) References Cited

U.S. PATENT DOCUMENTS

| | | | | |
|---|---|---|---|---|
| 2008/0006328 | A1* | 1/2008 | Denike | F16K 1/221 |
| | | | | 137/312 |
| 2010/0270489 | A1* | 10/2010 | Mendoza | B64D 13/02 |
| | | | | 251/308 |
| 2013/0167815 | A1 | 7/2013 | Bareis | |
| 2017/0234437 | A1 | 8/2017 | Nishimura et al. | |

FOREIGN PATENT DOCUMENTS

| | | |
|---|---|---|
| JP | H05-045343 U | 6/1993 |
| JP | H08-170735 A | 7/1996 |
| JP | 2001-214987 A | 8/2001 |
| JP | 2011-058536 A | 3/2011 |
| JP | 2015-169280 A | 9/2015 |
| JP | 2017-141954 A | 8/2017 |
| JP | 2019-019851 A | 2/2019 |

OTHER PUBLICATIONS

Translation of JP2011058536 (Year: 2022).*
Apr. 28, 2020 International Search Report issued in International Patent Application No. PCT/JP2020/006985.
Sep. 28, 2021 International Preliminary Report on Patentability issued in International Patent Application No. PCT/JP2020/006985.
Jul. 20, 2021 Office Action issued in Japanese Patent Application No. 2019-058336.

* cited by examiner

BUTTERFLY VALVE

CROSS-REFERENCE

This application is a US national phase application of International Application No. PCT/JP2020/006985, filed on Feb. 21, 2020, and claiming the priority of Japanese Application No. 2019-058336, filed Mar. 26, 2019, whose entire disclosures are incorporated herewith by reference.

TECHNICAL FIELD

The present invention relates to a butterfly valve including a motor, a passage, a rod disposed in a direction orthogonal to the passage, and a butterfly valve element joined to the rod to open and close the passage by rotation of the rod by the motor.

BACKGROUND ART

Heretofore, in most semiconductor manufacturing processes, a butterfly valve having large conductance in a passage is placed between a vacuum chamber and a vacuum pump as a vacuum pressure control device to control vacuum pressure of the vacuum chamber. For example, as described in the patent document 1, there is utilized a butterfly valve in which a butterfly valve element joined to a rod comes to and out of contact with an annular valve seat by rotation of the rod by a motor.

RELATED ART DOCUMENTS

Patent Documents

Patent Document 1: JP2019-019851A

SUMMARY OF INVENTION

Problems to be Solved by the Invention

However, the above-mentioned prior technique has the following problem.

The butterfly valve element described in the above patent document 1 is joined to the rod in a manner that a center of the butterfly valve element is eccentrically placed from a rotary central axis of the rod. Namely, a gravity center of the butterfly valve element is out of the rotary central axis of the rod, and thus a centrifugal force is generated when the rod is rotated to open and close a passage by the butterfly valve element, resulting in misalignment in the rotary central axis of the rod due to the centrifugal force. This misalignment of the rotary central axis of the rod leads to extreme load to a ball bearing which journals the rod, causing damage on the ball bearing and causing interference of the butterfly valve element on an inner wall of the passage. This could result in a problem of giving a bad influence on a life expectancy of the butterfly valve. Especially in recent years, a cycle of semiconductor manufacturing process has been accelerated by a method of Atomic Layer Deposition (ALD), which leads to acceleration in a speed of vacuum pressure control by the butterfly valve. Thereby, a period of time from fully opening to fully closing (or from fully closing to fully opening) of the butterfly valve element is exclusively fast in its rotation speed, for example, about 0.1 seconds. As the rotation speed is high, the rotary central axis of the rod is easily displaced by the centrifugal force, so that the above problem could be further apparent.

The present invention has been made to solve the above problem and has a purpose of providing a butterfly valve with high life expectancy that can restrain a centrifugal force generated in a rod during opening and closing operation of a butterfly valve element and can restrain misalignment of a rotary central axis of the rod.

Means of Solving the Problems

A butterfly valve according to one embodiment of the present invention has the following configuration.

(1) A butterfly valve is configured to comprise: a motor; a passage; a rod connected to the motor and placed in a direction orthogonal to the passage; and a butterfly valve element joined to the rod to open and close the passage by rotation of the rod by the motor, wherein a joint-body gravity center as a gravity center of the joint body at least including the rod and the butterfly valve element as constituent components is positioned on an axis of a rotary shaft of the motor.

(2) In the configuration described in (1), preferably, the joint body is configured such that each constituent-component gravity center as a gravity center of each constituent component configuring the joint body is placed on an imaginary plane passing through the axis, on the imaginary plane, a distance from the axis to the constituent-component gravity center placed in one region partitioned by the axis is defined as a positive value, and a distance from the axis to the constituent-component gravity center placed in the other region partitioned by the axis is defined as a negative value, and moment is calculated by multiplying mass of the constituent component by a distance between the constituent-component gravity center and the axis so that a sum of the calculated moment is arranged to become substantially zero.

(3) In the configuration described in (1) or (2), preferably, the joint body is formed by joining the butterfly valve element to the rod by a fixing member, and the joint-body gravity center is considered with a gravity center of the fixing member.

(4) In the configuration described in (3), preferably, the fixing member is any one of a screw with a washer and a rivet.

(5) In the configuration described in (1) or (2), preferably, the joint body is formed by joining the butterfly valve element to the rod by welding, and a bead generated by the welding is removed.

(6) In the configuration described in any one of (1) to (5), preferably, the motor is a direct drive motor.

(7) In the configuration described in any one of (1) to (6), preferably, the rod is journaled in a both-ends-supported state by a bush and two ball bearings which are arranged adjacent to each other in an axial direction of the rod, each of the two ball bearings is formed of an outer ring, an inner ring, a rolling element placed between the outer ring and the inner ring, each of the two ball bearings is pre-compressed and an imaginary line connecting a contact point of the outer ring and the rolling element with a contact point of the inner ring and the rolling element has an angle with respect to a radial direction of the rod, and an angle formed by each of the imaginary lines of the two ball bearings are arranged to be enlarged toward the rod.

(8) In the configuration described in any one of (1) to (7), preferably, comprises: a temperature sensor to measure a temperature of a valve body provided inside with the passage; a heater to adjust the temperature of the valve body based on a measured value of the temperature sensor; and a thermostat to detect excessive temperature rise in the valve body.

Effects of the Invention

A butterfly valve of the present invention has the following operations and effects by the above-mentioned configuration.

According to the configuration described in the above (1), the joint-body gravity center as the gravity center of the joint body of the rod and the butterfly valve element is placed on the axis of the rotary shaft of the motor, and thus when the rod is rotated by the motor, the rod is hardly subjected to the centrifugal force. With less centrifugal force applied to the rod, it is possible to restrain misalignment of the rotary central axis of the rod. Further, with less misalignment of the rotary central axis, the load applied to a component (such as a ball bearing) journaling the rod can be reduced and interference of the butterfly valve element on the inner wall of the passage can be prevented, thereby improving the life expectancy of the butterfly valve.

According to the configuration described in the above (2), the joint body is configured such that each constituent-component gravity center as the gravity center of each constituent component configuring the joint body is placed on the imaginary plane passing through the axis of the rotary shaft, and on the imaginary plane state, the distance of the axis to the constituent-component gravity center placed in one region partitioned by the axis is defined as the positive value, and the distance of the axis to the constituent-component gravity center placed in the other region is defined as the negative value. The moment for the respective constituent components is calculated by multiplying the mass of the constituent component by the distance between the constituent-component gravity center and the axis, and the sum of the calculated moments is arranged to become substantially zero. Accordingly, the moment applied to the respective constituent components configuring the joint body is kept its balance on the axis, so that the joint-body gravity center of the joint body is positioned on the axis. Therefore, even when the rod is rotated by the motor, the rod is hardly subjected to the centrifugal force, and thus it is possible to restrain misalignment of the rotary central axis of the rod.

According to the configuration described in the above (3) or (4), in the joint body, the butterfly valve element is joined to the rod by the fixing member such as the screw with the washer or the rivet. The joint-body gravity center is considered with the gravity center of the fixing member, and accordingly, the joint-body gravity center of the joint body including the fixing member is placed on the axis of the rotary shaft of the motor. Therefore, even when the rod is rotated by the motor, the rod is hardly subjected to the centrifugal force. With less centrifugal force applied to the rod, it is possible to restrain misalignment of the rotary central axis of the rod.

According to the configuration described in the above (5), the joint body is formed by joining the butterfly valve element to the rod by welding, and the bead generated by the welding is removed. Accordingly, the joint-body gravity center is not influenced by a gravity center of the bead generated in the welding but determined only by the gravity center of the rod and the gravity center of the butterfly valve element.

According to the configuration described in the above (6), the motor rotating the rod is a direct drive motor, and thus the rod can be rotated at high speed. Conventionally, a stepper motor has been adopted as the butterfly valve in most cases, but in a case of utilizing the stepper motor, it takes, for example, about 0.5 seconds from fully opening to fully closing (or fully closing to fully opening) of the butterfly valve element, which hardly satisfies speed of 0.1 seconds required in ALD, for example. To address this, acceleration by utilizing the direct drive motor has been considered, but this acceleration could easily cause misalignment of the rotary central axis of the rod due to the centrifugal force, resulting in excessive load to the ball bearings journaling the rod. This excessive load has revealed the problem of giving a bad influence on the life expectancy of the butterfly valve such as damage on the ball bearing and the interference of the butterfly valve element on the inner wall of the passage. However, in the present invention, the joint-body gravity center as a gravity center of the joint body formed of the rod and the butterfly valve element is placed on the axis of the rotary shaft of the motor, and therefore, the rod is hardly subjected to the centrifugal force and it is possible to restrain misalignment of the rotary central axis of the rod. Accordingly, the above problem is solved, and acceleration in opening and closing operation of the butterfly valve element by the direct drive motor can be realized.

According to the configuration described in the above (7), the rod is journaled in the both-ends-supported state by the bush and the two ball bearings arranged adjacent to each other in the axial direction of the rod, and thus the rotary central axis of the rod is further stabilized and hardly displaced. Further, each of the two ball bearings is configured such that the imaginary line connecting the contact point of the outer ring and the rolling element with the contact point of the inner ring and the rolling element is arranged to have an angle with respect to the radial direction of the rod and the respective imaginary lines of the two ball bearings are arranged to enlarge their angles toward the rod. Accordingly, there is less inner clearance generated in the ball bearings journaling the rod, thus increasing the rigidity. With high rigidity in the ball bearings, the rod is prevented from oscillation during rotation, and accordingly, misalignment of the rotary central axis of the rod can be restrained.

According to the configuration described in the above (8), the temperature of the valve body can be adjusted by the temperature sensor and the heater. Further, the excessive temperature rise in the valve body can be detected by the thermostat, and thus excessive heating of the valve body due to thermal runaway of the heater can be prevented.

MODE FOR CARRYING OUT THE INVENTION

Figure 1:
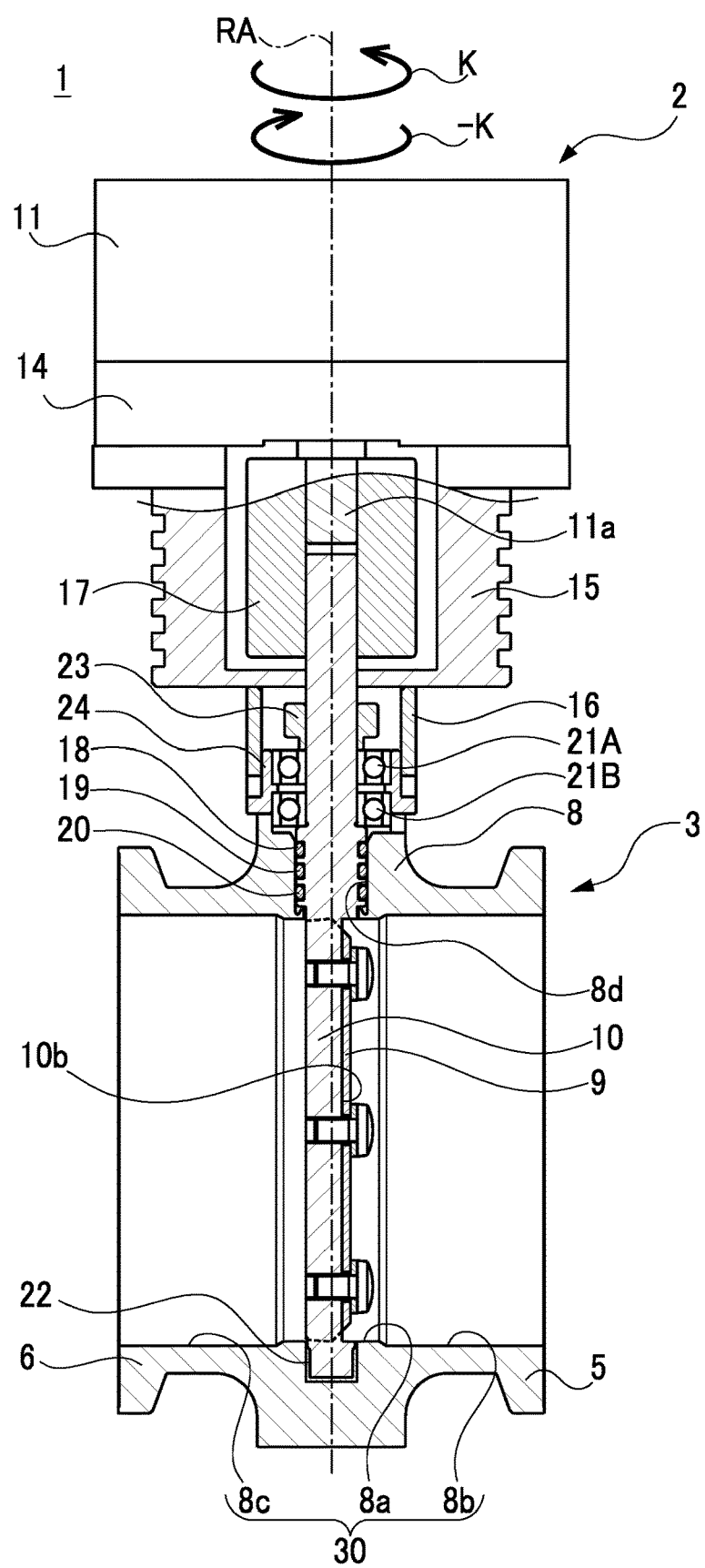
FIG. 1 is a sectional view of a butterfly valve in an embodiment of the present invention taken along a direction parallel to an axis of a rotary shaft and parallel to a passage.

An embodiment of a butterfly valve 1 of the present invention will be explained in detail with reference to the accompanying drawings. The butterfly valve 1 is used in a semiconductor manufacturing process as a vacuum pressure control device disposed on a pipe 34 connecting a vacuum chamber 32 and a vacuum pump 33 to control pressure in the vacuum chamber 32 to which gas is continuously supplied from a gas supply source 37 (see FIG. 7).

Figure 2:
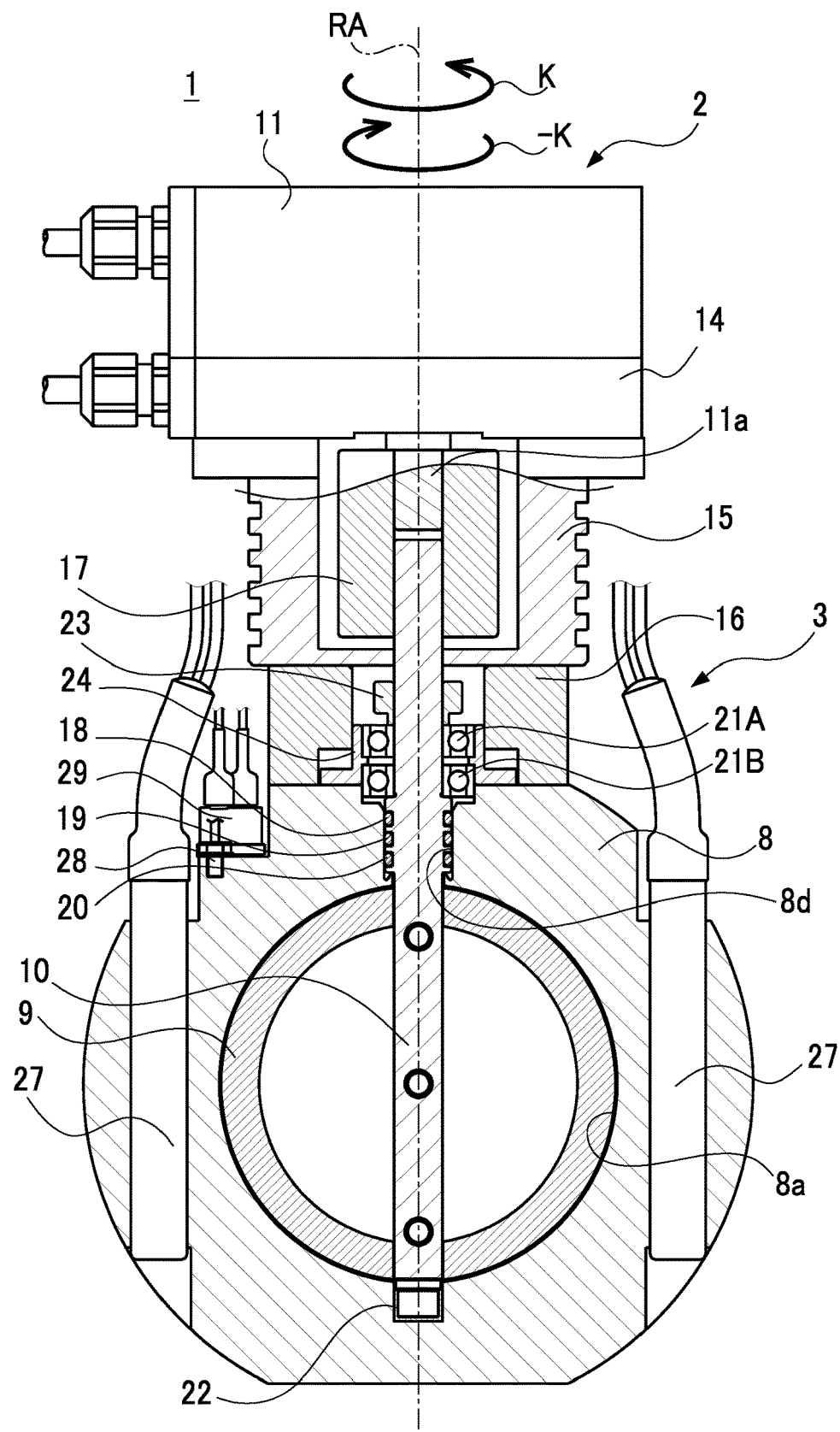
FIG. 2 is a sectional view of the butterfly valve in the embodiment of the present invention taken along a direction parallel to the axis of the rotary shaft and orthogonal to the passage.

FIG. 1 is a sectional view of the butterfly valve 1 according to the embodiment of the present invention taken along a direction parallel to a passage 30. Further, FIG. 2 is a side cross-sectional view of the butterfly valve in the embodiment of the present invention taken along a direction orthogonal to the passage. As shown in FIG. 1 and FIG. 2, the butterfly valve 1 includes a drive section 2 and a valve section 3.

Figure 7:
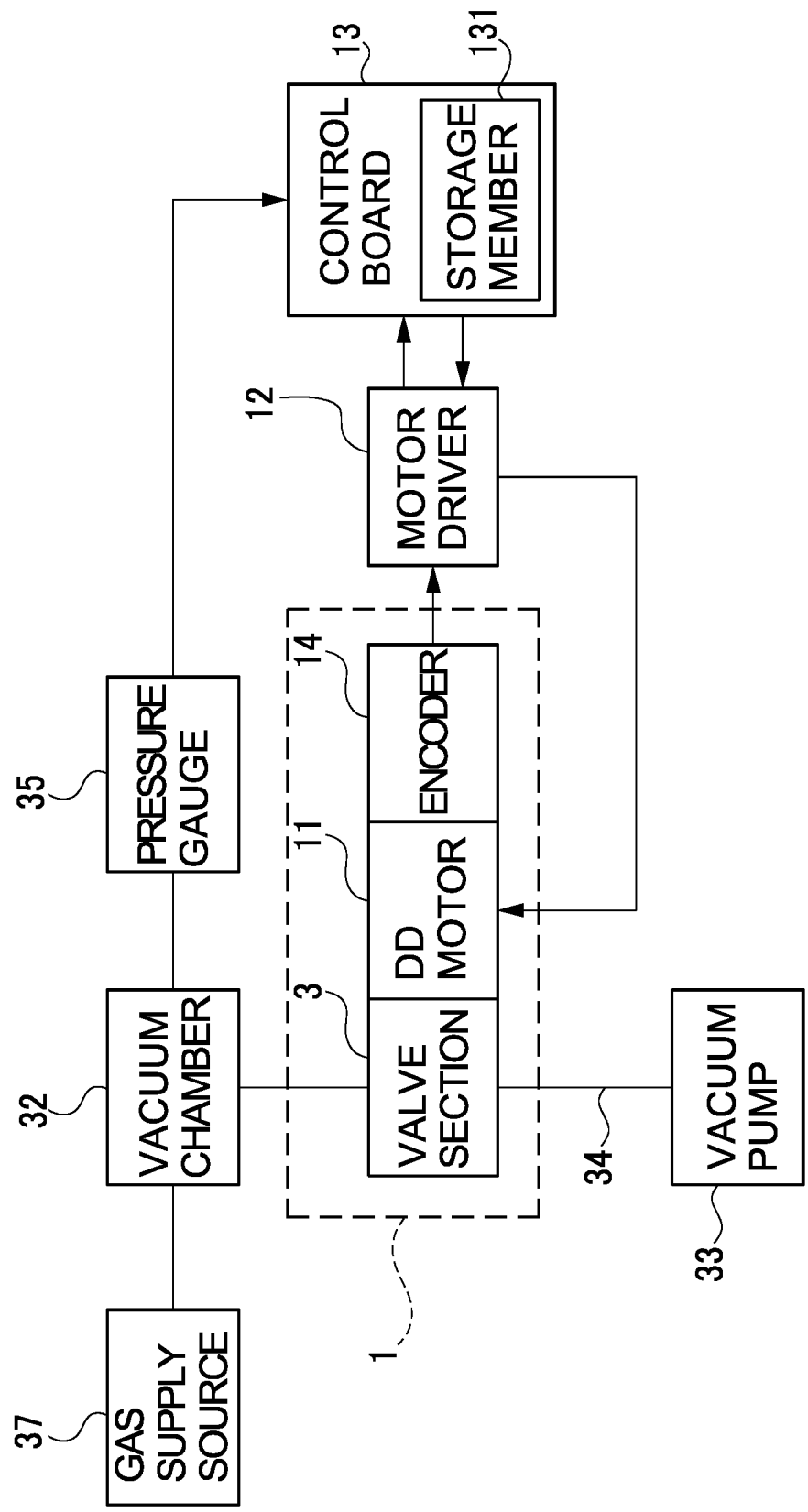
FIG. 7 is a schematic view of a vacuum pressure control system using the butterfly valve in the embodiment of the present invention.

The drive section 2 includes a direct drive motor (heretofore, referred as DD motor 11) as one example of a motor, and as shown in FIG. 7, the DD motor 11 is connected to a motor driver 12 and an encoder 14. Further, the motor driver 12 is connected to a control board 13. The DD motor 11 includes no intermediate mechanism such as a decelerator, and thus achieving size reduction in the drive section 2 and reduction in noises, and further achieving improvement in responsivity, speed stability performance, and accuracy in positioning. Accordingly, accuracy in vacuum pressure control by the butterfly valve 1 is enhanced. Further, the DD motor 11 includes a rotary shaft 11a, and a rotary central axis of the rotary shaft 11a is defined as an axis RA as shown in FIG. 1 and FIG. 2.

As shown in FIG. 7, to the control board 13, the motor driver 12 and a pressure gauge 35 to detect pressure in the vacuum chamber 32 are connected. The control board 13 includes a storage member 131, and the storage member 131 is stored with, for example, a rotation angle of the rod 10 corresponding to a fully-closed position of a butterfly valve element 9 and a rotation angle of the rod 10 corresponding to a fully-open position of the butterfly valve element 9, and a rotation angle of the rod 10 corresponding to any target pressure and others of the vacuum chamber 32. Based on a rotation angle read out from the storage member 131, the motor driver 12 controls rotation of the DD motor 11.

As shown in FIG. 1 and FIG. 2, the drive section 2 is coupled with the valve section 3 via a heat sink 15 and a thermal insulator 16. The valve section 3 is to be heated by fluid flowing in the passage 30 and a heater 27 which will be explained below, and the heat generated in the valve section 3 is prevented from being transferred to the drive section 2 by the heat sink 5 and the thermal insulator 16.

The valve section 3 includes a valve body 8, the rod 10, and the butterfly valve element 9. The valve body 8 is made of stainless-steel having corrosion resistance and thermal resistance. The valve body 8 is provided with an input port 5 on a right end in FIG. 1 and an output port 6 on a left end in FIG. 1. An inner wall of the input port 5 is formed with an input-side passage 8b, and an inner wall of the output port 6 is formed with an output-side passage 8c. Further, between the input-side passage 8b and the output-side passage 8c, there is formed a valve hole 8a formed of an inner wall of a circularly arcuate shape in its section. The input-side passage 8b, the valve hole 8a, and the output-side passage 8s are provided coaxially to constitute a series of the passage 30. The input port 5 is connected to the vacuum chamber 32 and the output port 6 is connected to the vacuum pump 33, respectively, to perform discharge of the vacuum chamber by the passage 30.

Further, the valve body 8 is provided with a thermocouple 28 as a temperature sensor as shown in FIG. 2, and the thermocouple 28 measures a temperature of the valve body 8. The valve body 8 is provided with a pair of heaters 27 to hold the valve hole 8a in order to keep the temperature of the fluid flowing in the passage 30. The heaters 27 are cartridge heaters and connected to an external control device (not shown) of the butterfly valve 1. The heaters 27 are controlled their turning-on and turning-off by the control device based on a measured value of the thermocouple 28 to adjust the temperature in the valve body 8. Further, the valve body 8 is provided with a thermostat 29. The thermostat 29 is to be operated when the heaters 27 are out of control to excessively heat the valve body 8. When the thermostat 29 is operated, the control device halts operation of the heaters 27.

Further, the valve body 8 is provided with an insertion hole 8d penetrating through an upper surface and the valve hole 8a in FIG. 1, and the rod 10 is inserted in the insertion hole 8d. The rod 10 inserted in the insertion hole 8d is disposed across the valve hole 8a in a direction orthogonal to the passage 30.

The rod 10 is formed by machining the stainless-steel having corrosion resistance and thermal resistance to be of a columnar shape. A portion of the rod 10 inserted in the passage 30 is formed with a valve element attachment part 10b of a substantially D-shape in section in a direction orthogonal to the axis RA (see FIG. 3 and FIG. 4). One end on a side where the rod 10 is not inserted into the passage 30 is connected to the rotary shaft 11a of the DD motor 11 via a joint 17. The joint 17 is a coupling of a metal-leaf spring type, and even when the rod 10 is heated by the fluid, the joint 17 obstructs transmission of that heat to the DD motor 11.

Three O-rings 18, 19, and 20 are arranged in series between the rod 10 and the inner wall of the insertion hole 8d in an axial direction of the rod 10. The O-rings 18, 19, and 20 are compressed by an outer circumferential surface of the rod 10 and the inner wall of the insertion hole 8d to prevent the fluid flowing in the passage 30 from leaking out of the insertion hole 8d toward the drive section 2. Herein, the O-rings 18, 19, and 20 are all the same type of rings.

Further, the rod 10 has one end on a side inserted in the passage 30 is journaled by a bush 22 in a rotatable manner. The bush 22 has high corrosion resistance and is made of resin with high sliding ability. The rod 10 is further journaled in a rotatable manner by two ball bearings 21A and 21B which are arranged in series in the axial direction of the rod 10 outside the valve body 8. The rod 10 is journaled in the both-ends-supported state by the ball bearings 21A and 21B and the bush 22, and thus the rotary central axis is stabilized and hard to be displaced.

Each one of the ball bearings 21A and 21B is precompressed by a collar 23, a bearing retainer 24, and a flange portion 10a (see FIG. 6) of the rod 10, respectively.

Figure 6:
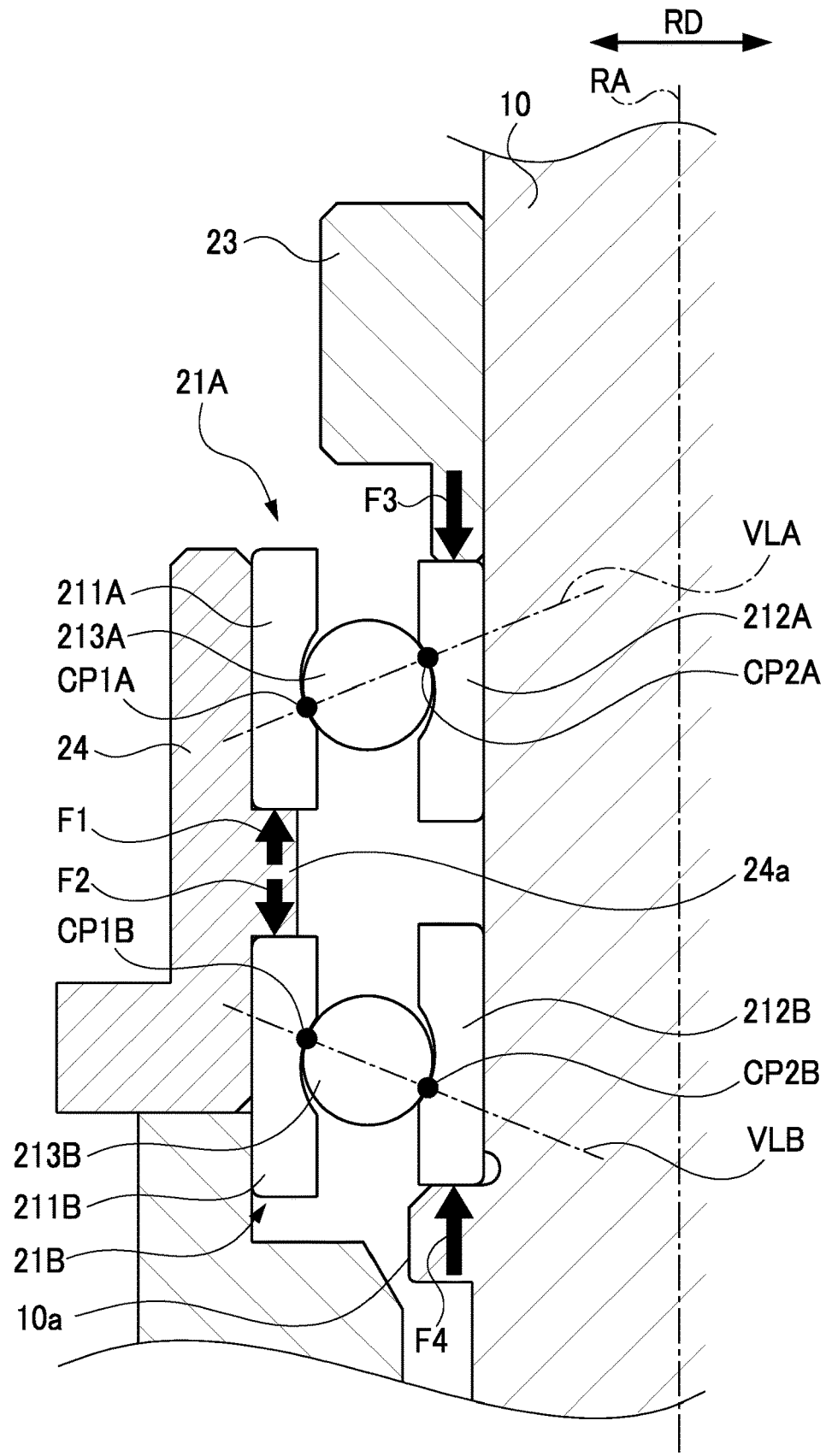
FIG. 6 is an enlarged view of ball bearings and their surroundings in FIG. 1.

Precompression is explained in detail with reference to FIG. 6. A protrusion 24a of the bearing retainer 24 is positioned between the ball bearing 21A and the ball bearing 21B to spread an outer ring 211A of the ball bearing 21A in a direction indicated with an arrow F1 and to spread an outer ring 211B of the ball bearing 21B in a direction F2. Further, an inner ring 212A of the ball bearing 21A is compressed by the collar 23 and a flange portion 10a of the rod 10 from an upper direction in the figure (indicated with an arrow F3), and an inner ring 212B of the ball bearing 21B is compressed from a lower direction in the figure (indicated with an arrow F4).

The outer rings 211A and 211B and the inner rings 212A and 212B are applied with the force from directions indicated with the arrows F1, F2, F3, and F4, respectively. By this force, an imaginary line VLA (VLB) depicted by linking a contact point CP1A (CP1B) of the outer ring 211A (211B) and a rolling element 213A (213B) with a contact point CP2A (CP2B) of the inner ring 212A (212B) and the rolling element 213A (213B) has an angle with respect to a radial direction (a direction indicated with an arrow RD in the figure) of the rod and an angle formed by the imaginary line VLA and the imaginary line VLB is arranged to expand toward the rod 10.

The above-mentioned precompression makes it hard to generate internal clearance in the ball bearings 21A and 21B, thereby increasing the rigidity, so that the oscillation in rotating the rod 10 is restrained and misalignment in the rotary central axis of the rod 10 can be restrained.

Figure 4:
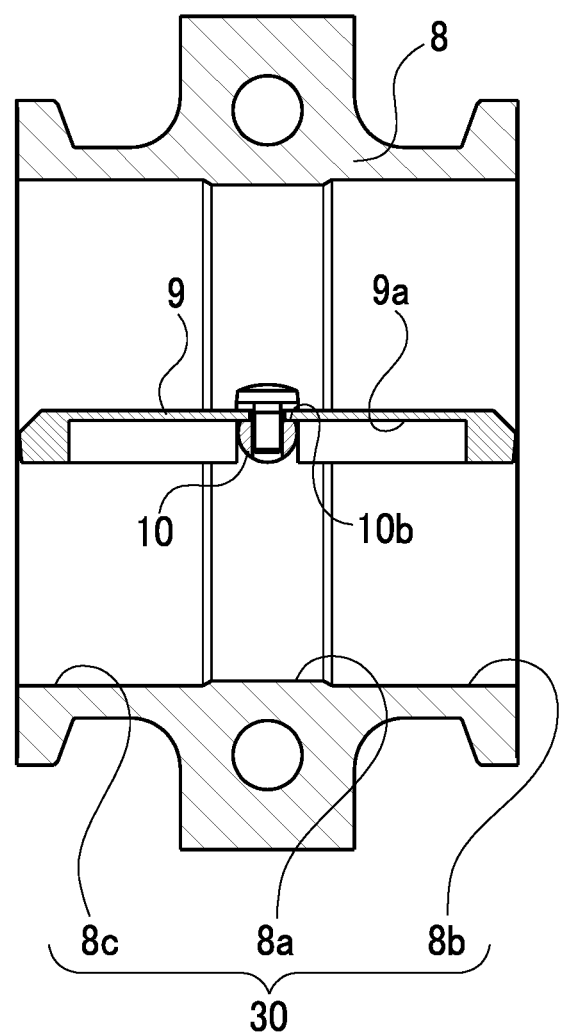
FIG. 4 is a sectional view of the butterfly valve in the embodiment of the present invention taken along a line orthogonal to the axial center of the rotary shaft, showing a state in which the butterfly valve element is in a fully-open position.
Figure 5:
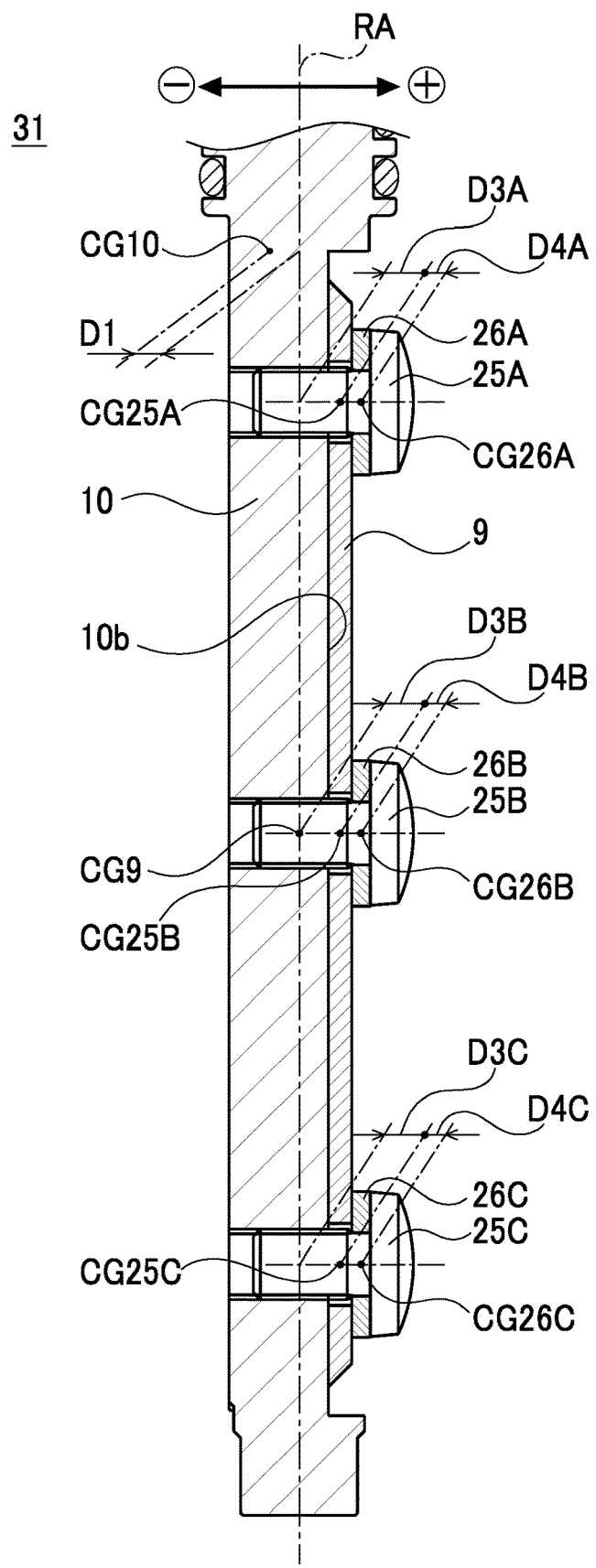
FIG. 5 is an enlarged view of a rotary joint body in FIG. 1.

The butterfly valve element 9 is formed by carving out the stainless-steel having corrosion resistance and thermal resistance to be of a disc-like shape. An outer diameter is substantially equal to an inner diameter of the valve hole 8a as shown in FIG. 2, and thus a clearance between an outer circumference of the butterfly valve element 9 and an inner wall of the valve hole 8a is made minimum. Further, the butterfly valve element 9 is provided with a recessed portion 9a to adjust a position of a gravity center CG9 (see FIG. 5) of the butterfly valve element 9, and thus the butterfly valve element 9 is of a substantially recessed shape (substantially C-shaped) in section in a direction orthogonal to the axis RA (see FIG. 3 and FIG. 4). The butterfly valve element 9 is joined to the rod 10 by screws 25A, 25B, and 25C and washers 26A, 26B, and 26C as shown in FIG. 5 to constitute the rotary joint body 31 with the rod 10. Herein, the screws 25A, 25B and 25C are all the same type of screws and the washers 26A, 26B, and 26C are all the same type of washers.

When the rotary shaft 11a of the DD motor 11 is rotated in a forward direction K about the axis RA, the rotary joint body 31 formed of the rod 10, the butterfly valve element 9, the screws 25A, 25B, and 25C, and the washers 26A, 26B, and 26C is rotated in a direction indicated with an arrow K (see FIGS. 1 and 2) as the forward direction since the rod 10 constituting the rotary joint body 31 is connected to the rotary shaft 11a via the joint 17. Thus, the butterfly valve element 9 having closed the valve hole 8a is rotated in the same direction to be in the fully-open position in which the passage 30 is open (see FIG. 4). Thereby, a large amount of discharge from the vacuum chamber 32 is realized.

Figure 3:
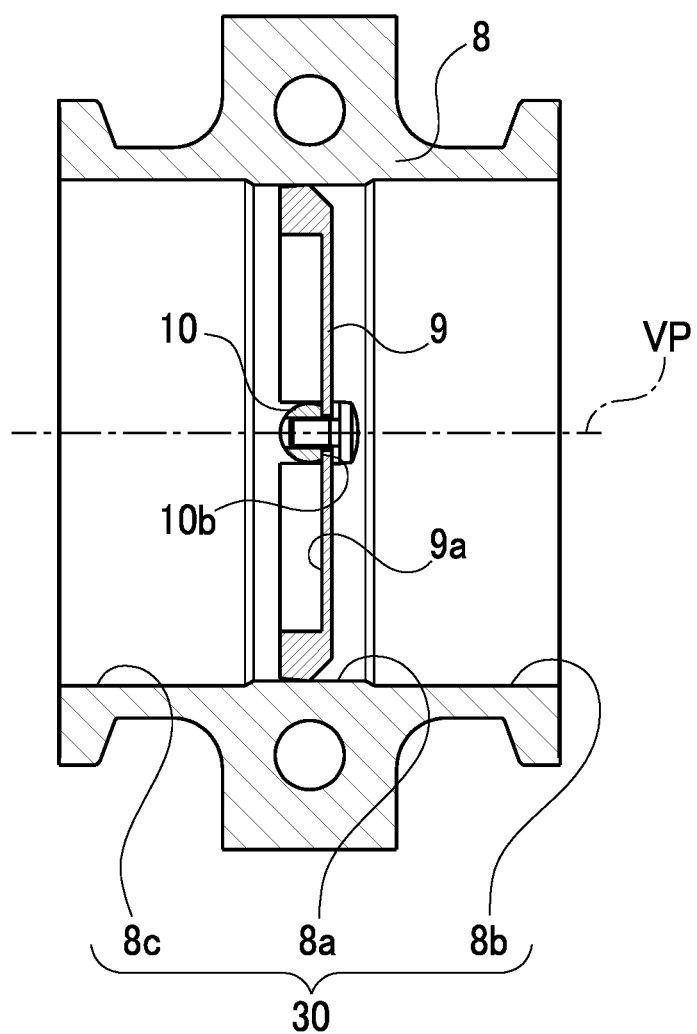
FIG. 3 is a sectional view of the butterfly valve in the embodiment of the present invention taken along a line orthogonal to the axial center of the rotary shaft, showing a state in which a butterfly valve element is in a fully-closed position.

On the other hand, when the rotary shaft 11a of the DD motor 11 is rotated in a rearward direction −K (see FIGS. 1 and 2) as a reversed direction from valve opening, the rotary joint body 31 is rotated in the direction of −K so that the butterfly valve element 9 closes the valve hole 8a to be in the fully-closed position (see FIG. 3). At this time, there is created a minimum clearance between an outer circumferential surface of the butterfly valve element 9 and the inner wall of the valve hole 8a, and accordingly, the valve hole 8a is not completely sealed and the butterfly valve element 9 takes a role of an aperture. Therefore, the vacuum chamber 32 is not halted its discharge operation but continuously discharged. This is because in case of the ALD, as long as the pressure in the vacuum chamber is controlled, there is no need to completely seal the passage 30. Further, the encoder 14 grasps the rotation angle of the rotary joint body 31, and an actual rotation angle of the butterfly valve element 9 rotated from the fully-open position to the fully-closed position (or from the fully-closed position to the fully-open position) is 90°.

Further, the gravity center of the rotary joint body 31 (the joint-body gravity center) is positioned on the axis RA as a rotary central axis of the rotary shaft 11a of the DD motor 11. Thus, when the rod 10 is rotated by the DD motor 11, the rod 10 is hardly subjected to the centrifugal force. With less centrifugal force to the rod 10, it is possible to restrain misalignment of the rotary central axis of the rod 10.

The rotary joint body 31 is configured as follows in order to dispose the gravity center of the rotary joint body 31 on the axis RA.

The rotary joint body 31 is configured with the rod 10, the butterfly valve element 9, the screws 25A, 25B, and 25C, and the washers 26A, 26B, and 26C, and the rotary joint body 31 is configured such that constituent-components gravity center as a gravity center of the respective components are placed on an imaginary plane VP (see FIG. 3) passing thought the axis RA. Herein, the constituent-component gravity center of the rod 10 is defined as a gravity center CG10. The constituent-component gravity center of the butterfly valve element 9 is defined as a gravity center CG9. The constituent-component gravity centers of the screws 25A, 25B, and 25C are defined as gravity centers CG25A, CG25B, CG25C, respectively. The constituent-component gravity centers of the washers 26A, 26B, and 26C are defined as gravity centers CG26A, CG26B, and CG26C, respectively (see FIG. 5).

On the imaginary plane VP, a distance between the axis RA and the constituent-component gravity center placed in one region partitioned by the axis RA is defined as a positive value while a distance between the axis RA and the constituent-component gravity center of the component placed in the other region is defined as a negative value. For each of the constituent-components, the distance of the constituent-component gravity center with the axis RA is multiplied by a mass of the constituent component to calculate moment, and sum of the thus calculated moment is arranged to become zero.

More specifically, as shown in FIG. 5, in a region on a right-side on the paper that is partitioned by the axis RA, a distance D3A of the gravity center CG25A and the axis RA, a distance D3B of the gravity center CG25B and the axis RA, a distance D3C of the gravity center CG25C and the axis RA, a distance D4A of the gravity center CG26A and the axis RA, a distance D4B of the gravity center CG26B and the axis RA, and a distance D4C of the gravity center CG26C and the axis RA are defined as the positive values (D3A, D3B, and D3C are all the same values, and thus they are coordinated as D3 in the following explanation, and D4A, D4B, and D4C are all the same values, and thus they are coordinated as D4 in the following explanation). In a region on a left side partitioned by the axis RA, a distance D1 of the gravity center CG10 and the axis RA is defined as the negative value. Herein, a distance D2 may be defined by a distance between the gravity center CG9 of the butterfly valve element 9 and the axis RA, but in the present embodiment, the gravity center CG9 is on the axis RA with the distance D2 of zero, and thus no indication of the distance D2 is given in the figure.

When the mass of the rod 10 is represented as W, the mass of the butterfly valve element 9 is represented as X, the mass of the respective screws 25A, 25B, and 25C is represented as Y, and the mass of the respective washers 26A, 26B, and 26C is represented as Z, the moment applied to the rod 10 is calculated as W×D1, the moment applied to the butterfly valve element 9 is calculated as X×D2, the moment applied to the respective screws 25A, 25B, and 25C is calculated as Y×D3, and the moment applied to the respective washers 26A, 26B, and 26C is calculated as Z×D4.

The configuration is thus arranged such that a total value (namely, W×D1+X×D2+(Y×D3)×3+(Z×D4)×3) of the respective moments becomes zero. The rotary joint body 31 is configured as above, and thus a balance of the moment applied to the respective constituent components configuring the rotary joint body 31 is kept on the axis RA, so that the gravity center of the rotary joint body 31 is positioned on the axis RA. Herein, positions of the gravity centers illustrated in FIG. 5 are merely examples, and thus they are not limited to the positions illustrated in the figure.

Next, an overview of vacuum pressure control by the butterfly valve 1 is explained. Even in a fully-closed position indicated in FIG. 3, the butterfly valve element 9 has a minute clearance with respect to an inner circumferential surface of the valve hole 8a, thereby functioning as an aperture. Accordingly, the butterfly valve 1 continuously performs discharge of the vacuum chamber 32 by suction of the vacuum pump 33. FIG. 4 shows the fully-closed position of the butterfly valve element 9, and the butterfly valve element 9 is rotated with a determined rotation angle between the fully-closed position (rotation angle of 0°) to a fully-open position (rotation angle of 90°) to adjust a passage area of the passage 30 so that the vacuum chamber 32 is under a target pressure.

For example, when further large amount of discharging is performed to lower the pressure in the vacuum chamber 32 from a state of the fully-closed position or a position rotated by a determined rotation angle, the control board 13 of the butterfly valve 1 reads out the rotation angle corresponding to the target pressure from the storage member 131. Then, based on the read-out rotation angle, the motor driver 12 drives the DD motor 11 by use of the encoder 14. The rod 10 is rotated in the forward direction K by the DD motor 11 to the read-out rotation angle. The butterfly valve element 9 constituting the rotary joint body 31 with the rod 10 is rotated in the forward direction K integrally with the rod 10, thereby enlarging the passage area of the passage 30 which has been narrowed.

When the discharging amount is to be reduced to increase the pressure in the vacuum chamber 32 from a state of the fully-open position or a position rotated by the determined rotation angle, the control board 13 of the butterfly valve 1 reads out the rotation angle corresponding to the target pressure from the storage member 131. Then, based on the read-out rotation angle, the motor driver 12 drives the DD motor 11 by use of the encoder 14. The rod 10 is rotated in −K which is a reversed direction from a case of reducing the pressure in the vacuum chamber 32. The butterfly valve element 9 constituting the rotary joint body 31 with the rod 10 is rotated in the rearward direction −K integrally with the rod 10, thereby narrowing the passage area of the enlarged passage 30.

Figure 8:
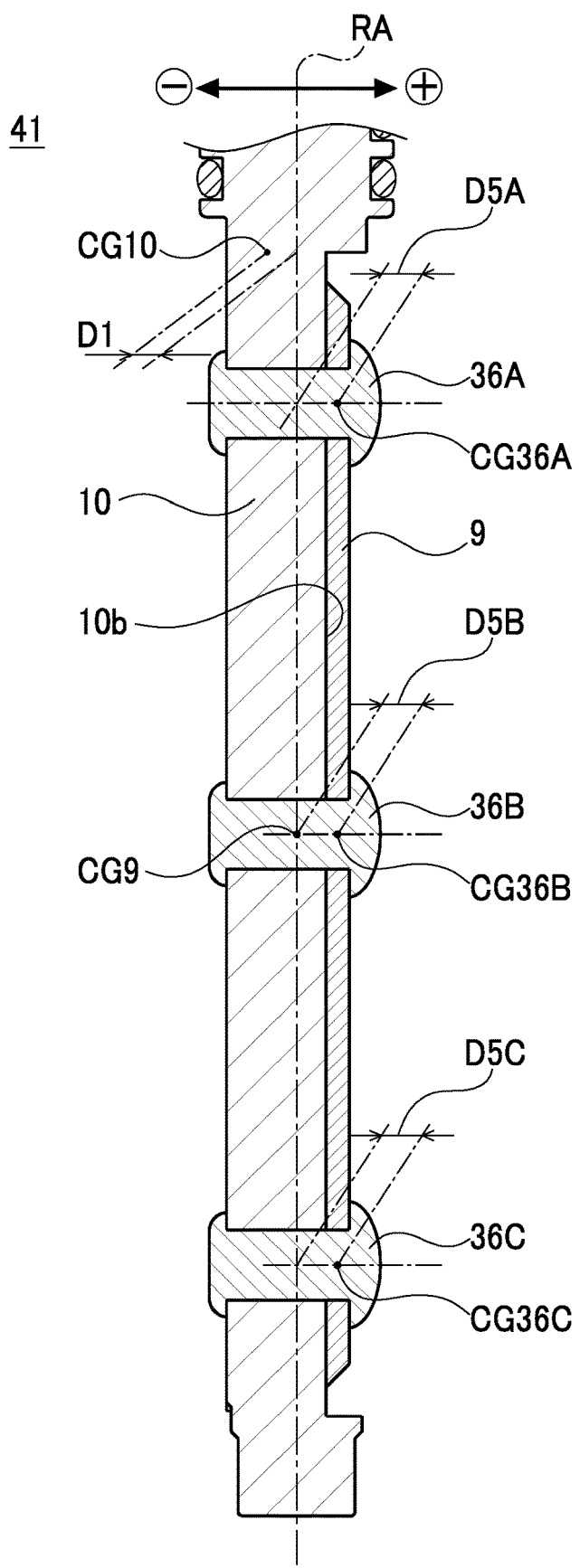
FIG. 8 is a view showing a modified example of the rotary joint body.

As a modified example of the rotary joint body 31, other than utilizing the screws 25A, 25B, and 25C with the washers 26A, 26B, and 26C to join the butterfly valve element 9 to the rod 10, utilizing rivets 36A, 36B, and 36C may be considered as shown in FIG. 8.

A rotary joint body 41 configured with the rivets 36A, 36B, and 36C is now explained. As shown in FIG. 8, the butterfly valve element 9 is fixed to the rod 10 by the rivets 36A, 36B, and 36C.

The rotary joint body 41 is configured such that the total moment applied to each of the rod 10, the butterfly valve element 9, the rivets 36A, 36B, and 36C becomes zero in order to dispose the gravity center of the rotary joint body 41 on the axis RA. In other words, constituent-component gravity centers of the rivets 36A, 36B, and 36C are defined as gravity center CG36A, CG36B, and CG36C, respectively, and each distance from the axis RA to the respective gravity center CG36A, CG36B, and CG36C is defined as D5A, D5B, and D5C (D5A, D5B, and D5C are all the same values, and thus they are cooperated to D5 in the following explanation). Further, when each of the rivets 36A, 36B, and 36C has mass of V, the rotary joint body 41 is configured to satisfy W×D1+X×D2+(V×D5)×3=0. The rotary joint body 41 is configured as above, and thus the gravity center of the rotary joint body 41 is to be positioned on the axis RA.

Another modified example of the rotary joint body 31 is to join the butterfly valve element 9 and the rod 10 by welding. When welding is adopted for joining, it becomes difficult to control a position of the gravity center since it is difficult to control an amount of bead generated in welding. Therefore, the bead needs to be shaved off after welding. By shaving off the bead, configuration of the rotary joint body considered only with the moment obtained by multiplying the mass W of the rod 10 by the distance D and the moment obtained by multiplying the mass X of the butterfly valve element 9 by the distance D2 can achieve positioning of the gravity center of the rotary joint body on the axis RA.

As explained above, according to the butterfly valve 1 of the present embodiment, the butterfly valve 1 includes the motor (the DD motor 11), the passage 30, the rod 10 connected to the motor (the DD motor 11) and placed in a direction orthogonal to the passage 30, and the butterfly valve element 9 jointed to the rod 10 to open and close the passage 30 by rotation of the rod 10 by the motor (the DD motor 11), and the joint-body gravity center as a gravity center of the joint body (the rotary joint body 31) constituted of at least the rod 10 and the butterfly valve element 9 is placed on the axis RA of the rotary shaft 11a of the motor (the DD motor 11). Accordingly, even when the rod 10 is rotated by the motor (the DD motor 11), the rod 10 is hardly subjected to the centrifugal force. With less centrifugal force applied to the rod 10, it is possible to restrain misalignment of the rotary central axis of the rod 10. Further, restraining misalignment of the rotary central axis can achieve reduction in the load applied to the ball bearings 21A and 21B journaling the rod 10 and also achieve prevention of interference of the butterfly valve element 9 on the inner wall of the passage 30 (the valve hole 8a), thereby improving the life expectancy of the butterfly valve 1.

Further, according to the butterfly valve 1 of the present embodiment, the joint body (the rotary joint body 31) is configured such that the constituent components (the butterfly valve element 9, the rod 10, the screws 25A, 25B, and 25C, the washers 26A, 26B, and 26C), configuring the rotary joint body 31 have the constituent-component gravity centers as the gravity centers (the gravity centers CG9, CG10, CG25A, CG25B, CG25C, CG26A, CG26B, and CG26C) and every one of the gravity centers is on the imaginary plane VP passing through the axis RA of the rotary shaft 11a.

On the imaginary plane VP, each of the constituent-component gravity centers (the gravity centers CG25A, CG25B, CG25C, CG26A, CG26B, and CG26C) positioned in one region partitioned by the axis RA of the rotary shaft 11a has a distance of a positive value with the axis RA, and the constituent-component gravity center (the gravity center CG10) positioned in the other region has a distance of a negative value with the axis RA. The rotary joint body is configured such that each distance of the axis RA with each of the constituent-component gravity centers (the gravity centers CG9, CG10, CG25A, CG25B, CG25C, CG26A, CG26B, and CG26C) is multiplied by the mass of the constituent component (W, X, Y, and Z) to calculate the moment and the total value of the calculated moment is arranged to become substantially zero. Accordingly, each moment acting on the respective constituent components configuring the joint body (the rotary joint body 31) is kept its balance on the axis RA, so that a joint-body gravity center of the joint body (the rotary joint body 31) is positioned on the axis RA. Therefore, even when the rod 10 is rotated by the motor (the DD motor 11), the rod 10 is hardly subjected to the centrifugal force, thereby restraining misalignment of the rotary central axis of the rod 10.

Further, according to the butterfly valve 1 of the present embodiment, the joint body (the rotary joint body 31) is formed by joining the butterfly valve element 9 to the rod 10 by a fixing tool. The joint-body gravity center is considered with a gravity center of the fixing tool, and the fixing tool is any one of the screws 25A, 25B, and 25C with the washers 26A, 26B, and 26C or any one of the rivets 36A, 36B, and 36C. Accordingly, the joint body (the rotary joint body 31) is configured by joining the butterfly valve element 9 to the rod 10 by the fixing tool such as the screws 25A, 25B, and 25C with the washers 26A, 26B, and 26C or the rivets 36A, 36B, and 3C, and the joint-body gravity center is considered with the gravity center of the fixing tool. Thus, the joint-body gravity center of the joint body (the rotary joint body 31) including the fixing tool is positioned on the axis of the rotary shaft of the motor (the DD motor 11), and thereby, even if the rod 10 is rotated by the motor (the DD motor 11), the rod 10 is hardly subjected to the centrifugal force. With less centrifugal force on the rod 10, it is possible to restrain misalignment of the rotary central axis of the rod 10.

Further, according to the butterfly valve 1 of the present embodiment, the joint body (the rotary joint body 31) is configured by joining the butterfly valve element 9 to the rod 10 by welding, and the bead generated in welding has been removed. Therefore, the joint body gravity center is determined only by the gravity center CG10 of the rod 10 and the gravity center CG9 of the butterfly valve element 9 without influenced by the gravity center of the bead generated by welding.

Further, according to the butterfly valve 1 of the present embodiment, the motor is the DD motor 11. The motor for rotating the rod 10 is thus the DD motor 11, which achieves high-speed rotation of the rod 10. Conventionally, the butterfly valve 1 has been mostly provided with a stepper motor, but the stepper motor requires about 0.5 seconds from fully opening to fully closing (or from fully closing to fully opening) of the butterfly valve element 9, and this period of time cannot satisfy the target of 0.1 seconds requested by the ALD, for example. In response to this, acceleration by use of the DD motor 11 has been considered, but such acceleration could easily cause misalignment in the rotary central axis due to the centrifugal force, so that there have been revealed problems that the ball bearings 21A and 21B journaling the rod 10 could be subjected to excessive load to cause damage, and the butterfly valve element 9 could be interfered with the inner wall of the passage 30 (the valve hole 8a), which could give a bad influence on the life expectancy of the butterfly valve 1. On the other hand, the present invention is configured such that the joint-body gravity center as the gravity center of the joint body (the rotary joint body 31) of the rod 10 and the butterfly valve element 9 is positioned on the axis RA of the rotary shaft 11a of the DD motor 11, and thus the rod 10 is hardly subjected to the centrifugal force, thereby restraining misalignment of the rotary central axis of the rod 10. Therefore, the above problem has been solved and acceleration in opening and closing the butterfly valve element 9 by the DD motor 11 can be realized.

Further, according to the butterfly valve 1 of the present embodiment, the rod 10 is journaled in a both-ends-supported state by the bush 22 and the two ball bearings 21A and 21B which are arranged adjacent to each other in the axial direction of the rod 10. The two ball bearings 21A and 21B are configured with the outer rings 211A and 211B, the inner rings 212A and 212B, the rolling elements 213A and 213B placed between the outer rings 211A and 211B and the inner rings 212A and 212B, respectively. The two ball bearings 21A and 21B are each pre-compressed such that the imaginary lines VLA and VLB, which are depicted by linking the respective contact points of the outer rings 211A and 211B with the rolling elements 213A and 213B to the contact points of the inner rings 212A and 212B with the rolling elements 213A and 213B, have angles with respect to the radial direction of the rod, and the angles formed by the imaginary lines VLA and VLB of the two ball bearings are arranged to enlarge their angles toward the rod 10. Therefore, the rod 10 is journaled by the bush 22 and the two ball bearings 21A and 21B arranged adjacent to each other in the axial direction of the rod 10 in the both-ends-supported state, and thus the rotary central axis is further stabilized and hardly displaced.

The two ball bearings 21A and 21B are configured such that the imaginary lines VLA and VLB are depicted by linking the contact points of the outer rings 211A and 211B and the rolling elements 213A and 213B to the contact points of the inner rings 212A and 212B and the rolling elements 213A and 213B, respectively, so that the imaginary lines VLA and VLB have the angles with respect to the radial direction of the rod 10. The angles formed by the imaginary lines VLA and VLB of the two ball bearings 21A and 21B are arranged to enlarge their angles toward the rod 10, so that there is less inner clearance generated in the ball bearings 21A, 21B journaling the rod 10, and thereby the rigidity is improved. With higher rigidity in the ball bearings 21A and 21B, oscillation in rotation of the rod 10 can be restrained, and thus the rotary central axis of the rod 10 is restrained from misalignment.

Further, the butterfly valve 1 of the present embodiment is provided with a temperature sensor (the thermocouple 28) to measure a temperature of the valve body 8 provided inside with the passage 30, the heater 27 to adjust the temperature of the valve body 8, and the thermostat 29 to detect the excessive temperature rise in the valve body 8. Thus, the temperature in the valve body 8 can be adjusted by the thermocouple 28 and the heater 27. Further, the excessive temperature rise in the valve body 8 can be detected by the thermostat 29, and thus the valve body 8 is prevented from being excessively heated due to thermal runaway of the heater 27.

The present embodiment is only an illustration and gives no any limitation to the present invention. Accordingly, the present invention can be given with various improvements and modifications without departing from the essential characteristics thereof. For example, in the present embodiment, the passage 30 is not completely sealed even when the butterfly valve element 9 is in the fully-closed position, but alternatively, the valve hole 8a may be provided with a valve seat to bring the butterfly valve element 9 into contact with the valve seat to completely seal the valve hole 8a.

REFERENCE SIGNS LIST

1 Butterfly valve
9 Butterfly valve element
10 Rod
11 DD motor (one example of motor)
11a Rotary shaft
30 Passage
31 Rotary joint body (one example of joint body)
RA Axis

The invention claimed is:

1. A butterfly valve comprising: a motor; a passage; a rod connected to the motor and placed in a direction orthogonal to the passage; and a butterfly valve element joined to the rod to open and close the passage by rotation of the rod by the motor, wherein
   a joint-body gravity center as a gravity center of a joint body at least including the rod and the butterfly valve element as constituent components is positioned on an axis of a rotary shaft of the motor,
   the joint body is formed by joining the butterfly valve element to the rod by a fixing member, and the joint-body gravity center is considered with a gravity center of the fixing member,
   the fixing member is any one of a screw with a washer and a rivet, and
   the butterfly valve is a non-sealed-type butterfly valve having a clearance between an outer circumferential surface of the butterfly valve element and an inner wall of the passage when the butterfly valve element is in a fully-closed position.

2. The butterfly valve according to claim 1, wherein the joint body is configured such that
   each constituent-component gravity center as a gravity center of each constituent component configuring the joint body is placed on an imaginary plane passing through the axis,
   on the imaginary plane, a distance from the axis to the constituent-component gravity center placed in one region partitioned by the axis is defined as a positive value, and a distance from the axis to the constituent-component gravity center placed in the other region partitioned by the axis is defined as a negative value, and
   moment is calculated by multiplying mass of the constituent component by a distance between the constituent-component gravity center and the axis so that a sum of the calculated moment is arranged to become substantially zero.

3. The butterfly valve according to claim 1, wherein the motor is a direct drive motor.

4. The butterfly valve according to claim 1, wherein
   the rod is journaled in a both-ends-supported state by a bush and two ball bearings, the ball bearings being arranged adjacent to each other in an axial direction of the rod,
   each of the two ball bearings is formed of an outer ring, an inner ring, a rolling element placed between the outer ring and the inner ring,
   each of the two ball bearings is pre-compressed and an imaginary line connecting a contact point of the outer ring and the rolling element with a contact point of the inner ring and the rolling element has an angle with respect to a radial direction of the rod, and
   an angle formed between the imaginary lines of the two ball bearings is arranged to be enlarged toward the rod.

5. The butterfly valve according to claim 1, comprising:
   a temperature sensor to measure a temperature of a valve body provided inside with the passage;
   a heater to adjust the temperature of the valve body based on a measured value of the temperature sensor; and
   a thermostat to detect excessive temperature rise in the valve body.

* * * * *